(12) United States Patent
Joshi

(10) Patent No.: US 7,447,174 B2
(45) Date of Patent: Nov. 4, 2008

(54) SYSTEM AND METHOD FOR DETECTING NODE MOBILITY BASED ON NETWORK TOPOLOGY CHANGES IN A WIRELESS COMMUNICATION NETWORK

(75) Inventor: Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 404 days.

(21) Appl. No.: 11/329,239

(22) Filed: Jan. 10, 2006

(65) Prior Publication Data
US 2007/0160009 A1 Jul. 12, 2007

(51) Int. Cl.
*H04Q 7/28* (2006.01)
(52) U.S. Cl. .................. 370/328; 370/338; 370/336; 455/457; 455/456.1
(58) Field of Classification Search .................. 370/328, 370/338, 336; 455/457, 456.1
See application file for complete search history.

(56) References Cited

U.S. PATENT DOCUMENTS

| | | | |
|---|---|---|---|
| 2001/0046870 A1 | 11/2001 | Stilp et al. | |
| 2004/0048618 A1* | 3/2004 | O'neill et al. | 455/445 |
| 2004/0143842 A1 | 7/2004 | Joshi | |
| 2004/0162819 A1* | 8/2004 | Omae et al. | 707/3 |
| 2004/0192347 A1* | 9/2004 | Leizerovich et al. | 455/456.1 |
| 2004/0203820 A1* | 10/2004 | Billhartz | 455/452.1 |
| 2005/0185606 A1* | 8/2005 | Rayment et al. | 370/328 |
| 2005/0228613 A1* | 10/2005 | Fullerton et al. | 702/150 |
| 2006/0067286 A1* | 3/2006 | Cornett | 370/338 |

* cited by examiner

*Primary Examiner*—Danh C Le
(74) *Attorney, Agent, or Firm*—Randi L. Karpinia; Joseph J. Buczynski

(57) ABSTRACT

Techniques are provided for determining mobility of a first node in an ad hoc network. A particular node generates a fixed neighbor node table comprising second nodes in the area of the particular node which are not mobile. The particular node can monitor changes between the first node and the second nodes, and then determine if the first node is mobile based on the changes.

18 Claims, 9 Drawing Sheets

SYSTEM AND METHOD FOR DETECTING NODE MOBILITY BASED ON NETWORK TOPOLOGY CHANGES IN A WIRELESS COMMUNICATION NETWORK

FIELD OF THE INVENTION

The present invention relates generally to wireless communications and more particularly to determining node mobility in mobile ad hoc networks.

BACKGROUND

Wireless networks have experienced increased development in the past decade. Two types of wireless networks are infrastructure-based wireless networks, and ad hoc wireless networks.

An infrastructure-based wireless network typically includes a communication network with fixed and wired gateways. Many infrastructure-based wireless networks employ a mobile unit which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Ad hoc networks can also be self-healing. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that their transmission range is usually relatively limited in comparison to cellular networks. Each node can typically directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. To assist with relaying of packets, each node may maintain routes or routing information to other nodes in the network and can utilize routing techniques to adapt to changes in the interconnectivity between nodes. The nodes can maintain this routing information by performing periodic link and topology updates. Alternatively, nodes may discover routing information only when needed, instead of utilizing updates to maintain routes.

As can be appreciated from the dynamic nature of wireless ad-hoc networks such as those discussed above, the neighborhood topology of a particular node can change rapidly over time. One approach to detect mobility amongst nodes in a network is to employ active time-of-flight measurements. This method entails performing active measurements on the time-of-flight (or transmission time) between a particular node and a stationary device. The rate of change of the time-of-flight value determines the mobility of the particular node. This method, however, requires the sending of special "time-of-flight" messages to the stationary devices, which requires repetitive and extraneous measurements and comparisons. Moreover, this method fails to account for situations where a node moves in a substantially elliptical or circular manner around a particular fixed node. In these situations the "time-of-flight measurements" will be approximately the same value and, hence, the node will incorrectly assume itself to be stationary. Moreover, time-of-flight measurements also consume a significant number of CPU cycles to do accurate time measurements and comparisons and thus consume battery power.

Another approach for detecting mobility amongst nodes in a network is to employ signal strength measurements. Mobility of particular nodes can be estimated by the rate of change of signal power from a particular stationary node. This method, however, fails to account for RF interference from neighboring nodes and can therefore lead to inaccuracies.

Notwithstanding these advances, it would be desirable to provide improved techniques for determining whether a node in a wireless communication network, such as, an ad-hoc peer-to-peer multi-hop network or a mesh network, is mobile or stationary. It would also be desirable if such techniques consumed less computing resources, power and bandwidth.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
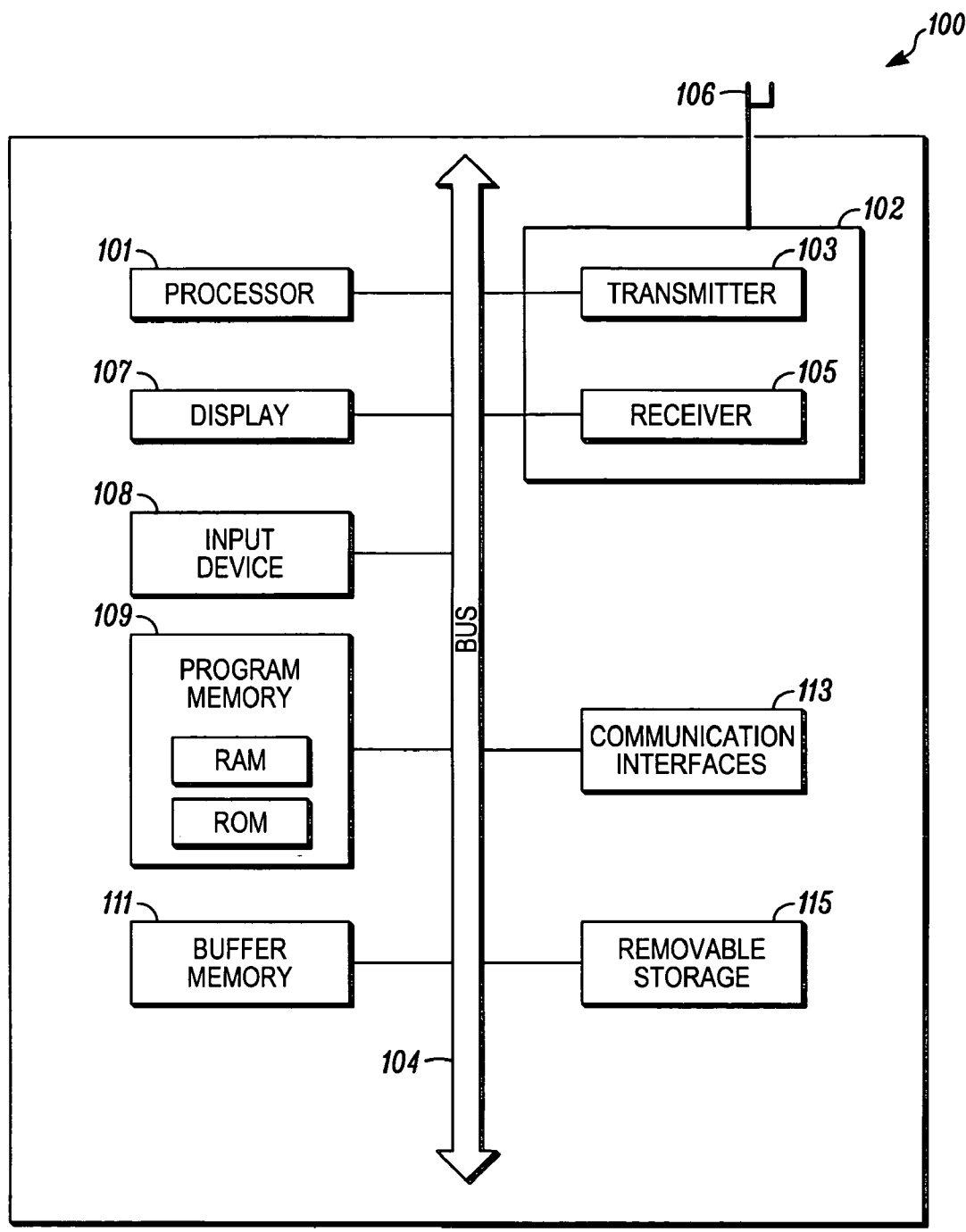
FIG. 1 is a block diagram of an exemplary node in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to determining node mobility in an ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions described herein for determining node mobility in an ad hoc network. The non-processor circuits may include, but are not limited to, a radio receiver, a radio transmitter, signal drivers, clock circuits, power source circuits, and user input devices. As such, these functions may be interpreted as steps of a method for determining node mobility in an ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The embodiments described below relate to a system and method for determining whether a particular node in a wireless communication network, such as, an ad-hoc peer-to-peer multi-hop network, is mobile or stationary, as well as the speed at which the particular node is moving. The particular node can track fixed neighbor nodes, such that changes in the neighborhood topology of the particular node over time can be used to determine or detect the degree of mobility of the particular node. The "degree of mobility" of a particular node refers to the presence or absence of mobility of a particular node in a wireless ad-hoc network. In particular, "degree of mobility" encompasses a range of mobility from no mobility (e.g., the particular node is stationary) to a low level of mobility (e.g., the particular node is mobile, but is moving at a low level of velocity), to a high level of mobility (e.g., the particular node is mobile and is changing locations at a high velocity rate). These techniques can be used for distinguishing mobile nodes from stationary nodes in a network, in order to obtain a real-time picture of neighborhood topologies in the network and to maximize efficiency of the network.

In one implementation, techniques are provided for assessing the degree of mobility of a particular node in a mobile ad-hoc network. The particular node can monitor and record each fixed neighbor node in a FNNT of the particular node. The particular node can monitor and record an entry time to and an exit time for each fixed neighbor node, and quantify the average contact period for the fixed neighbor node. An average contact period greater than a threshold duration indicates a lack of mobility of the particular node.

Exemplary Node

FIG. 1 is a block diagram of an exemplary node 100 in accordance with some embodiments of the invention. The node 100 comprises a processor 101, a transceiver 102 including a transmitter circuitry 103 and a receiver circuitry 105, an antenna 106, a display 107, an input device 108, a program memory 109 for storing operating instructions that are executed by the processor 101, a buffer memory 111, one or more communication interfaces 113, and a removable storage unit 115. Although not shown, the node 100 also preferably includes an antenna switch, duplexer, circulator, or other highly isolative means (not shown) for intermittently providing information packets from the transmitter circuitry 103 to the antenna 106 and from the antenna 106 to the receiver circuitry 105. The node 100 is preferably an integrated unit containing at least all the elements depicted in FIG. 1, as well as any other elements necessary for the node 100 to perform its particular functions. Alternatively, the node 100 may comprise a collection of appropriately interconnected units or devices, wherein such units or devices perform functions that are equivalent to the functions performed by the elements of the node 100. For example, the node 100 may comprise a laptop computer and a wireless LAN (local area network) card.

The processor 101 preferably includes one or more microprocessors, microcontrollers, DSPs (digital signal processors), state machines, logic circuitry, or any other device or devices that process information based on operational or programming instructions. Such operational or programming instructions are preferably stored in the program memory 109. The program memory 109 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 101 has one or more of its functions performed by a state machine or logic circuitry, the memory 109 containing the corresponding operational instructions may be embedded within the state machine or logic circuitry. The operations performed by the processor 101 and the rest of the node 100 are described in detail below.

The transmitter circuitry 103 and the receiver circuitry 105 enable the node 100 to communicate information packets to and acquire information packets from the other nodes. In this regard, the transmitter circuitry 103 and the receiver circuitry 105 include circuitry to enable digital or analog transmissions over a wireless communication channel. The transmitter circuitry 103 and the receiver circuitry 105 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN, 802.16 WiMax, and the like).

The implementations of the transmitter circuitry 103 and the receiver circuitry 105 depend on the implementation of the node 100. For example, the transmitter circuitry 103 and the receiver circuitry 105 can be implemented as an appropriate wireless modem, or as conventional transmitting and receiving components of two-way wireless communication devices. In the event that the transmitter circuitry 103 and the receiver circuitry 105 are implemented as a wireless modem, the modem can be internal to the node 100 or insertable into the node 100 (e.g., embodied in a wireless a radio frequency (RF) modem implemented on a Personal Computer Memory Card International Association (PCMCIA) card). For a wireless communication device, the transmitter circuitry 103 and the receiver circuitry 105 are preferably implemented as part of the wireless device hardware and software architecture in accordance with known techniques. Most, if not all, of the functions of the transmitter circuitry 103 and/or the receiver circuitry 105 may be implemented in a processor, such as the processor 101. However, the processor 101, the transmitter circuitry 103, and the receiver circuitry 105 have been artificially partitioned herein to facilitate a better understanding.

The receiver circuitry 105 is capable of receiving RF signals from at least one bandwidth and optionally more bandwidths, if the communications with the proximate device are in a frequency band other than that of the network communications. The receiver circuitry 105 may optionally comprise a first receiver and a second receiver, or one receiver capable of receiving in two or more bandwidths. The receiver 105, depending on the mode of operation, may be tuned to receive, for example, Public Land Mobile Radio System (PLMRS), Advanced Mobile Phone Service (AMPS), GSM, CDMA, UMTS, WCDMA, Bluetooth, or WLAN (e.g., IEEE 802.11) communication signals. The transceiver 102 includes at least one set of transmitter circuitry 103. The at least one transmitter 103 may be capable of transmitting to multiple devices potentially on multiple frequency bands. As with the receiver 105, dual transmitters 103 may optionally be employed where one transmitter is for the transmission to a proximate node or direct link establishment to WLAN's and the other transmitter is for transmission to a cellular base station.

The antenna 106 comprises any known or developed structure for radiating and receiving electromagnetic energy in the frequency range containing the wireless carrier frequencies.

The buffer memory 111 may be any form of volatile memory, such as RAM, and is used for temporarily storing received information packets in accordance with the present invention.

When the node 100 is constructed to receive video information from a video source, the node 100 preferably further includes a video decoder capable of decoding the current Moving Picture Experts Group (MPEG) standard or some other video decoding standard. When the node 100 is further capable of transmitting video information, the node 100 preferably further includes a video encoder capable of encoding the video data into at least one of the foregoing video standards. Such video encoder and decoder is preferably implemented as part of the processor 101.

Exemplary Ad Hoc Network

Figure 2:
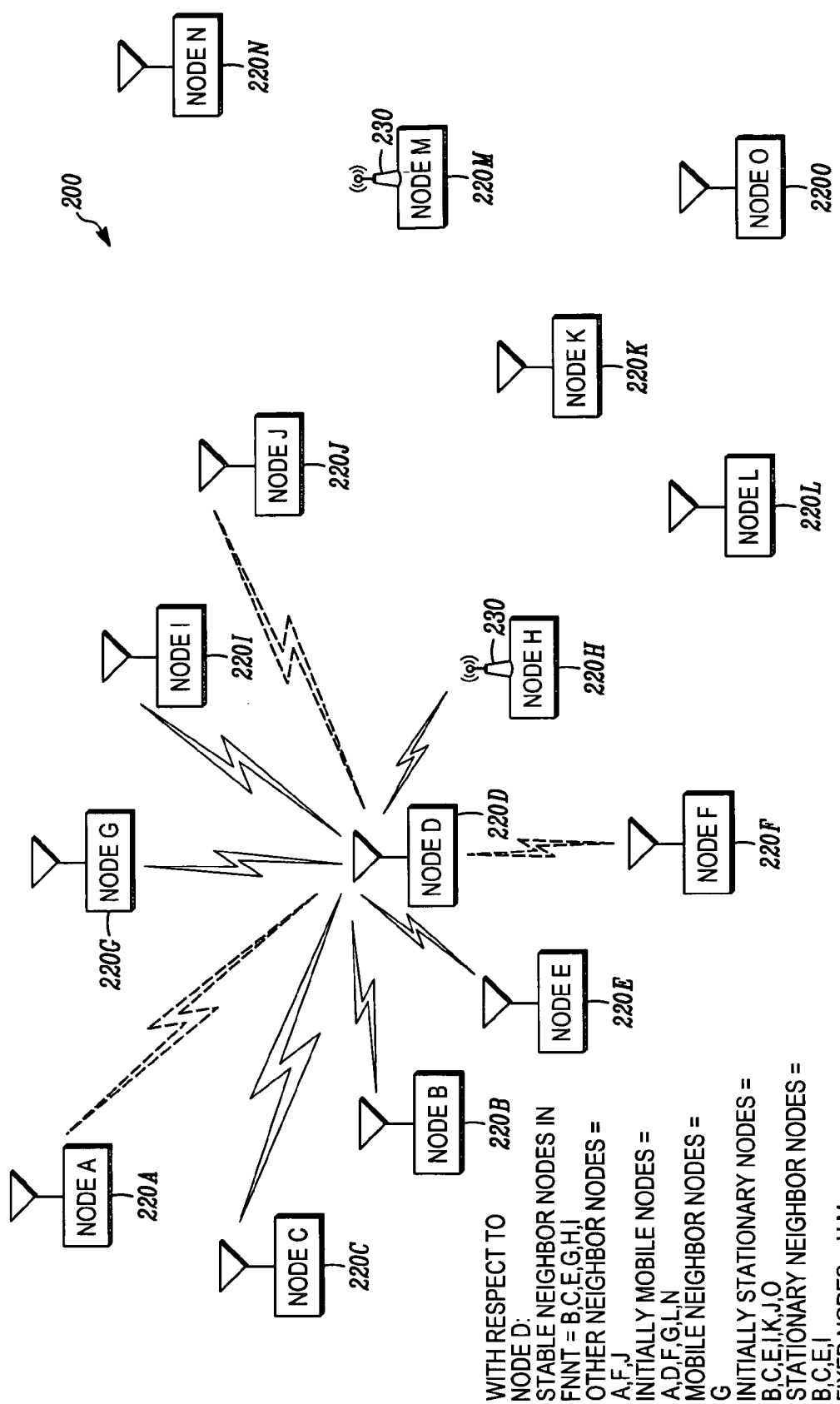
FIG. 2 is a block diagram of an exemplary ad hoc communication network at a first time.

FIG. 2 is a block diagram of an exemplary ad hoc communication network 200 at a first time instant.

The ad hoc communication network 200 can be created between a plurality of nodes 220A-220O each having wireless repeater and routing capability, and optionally wired Access Points (APs) 230. Clients can move seamlessly between infrastructure-based networks and client-based peer-to-peer networks. It will be appreciated by those of ordinary skill in the art that while the ad hoc network 200 in FIG. 2 is shown as operating in an infrastructure mode (e.g., including APs), the ad hoc network 200 of FIG. 2 does not require any network infrastructure to be present. Rather, the nodes 220A-220O typically support simultaneous operation in both infrastructureless mode and infrastructured mode.

In the ad hoc network 200, communications to or from nodes 220A-220O can "hop" through each other to reach other nodes 220A-220O in the network. The nodes 220A-220O can generally be wireless devices capable of receiving packetized audio, video and/or data information. Some of the components in an exemplary node, such as an appropriate processor, transmitter, receiver and antenna, are described above in FIG. 1. The nodes 220A-220O can communicate information packets over wireless carrier frequencies, each of which includes one or more wireless communication channels.

In infrastructured mode, the APs 230 is typically coupled to a wired network (not shown) and can provide one or more sources of audio, video and/or data information. The APs 230 may be a cellular base station, a wireless access point that complies with the IEEE 802.11 Standard or other wireless local area network (WLAN) Standards, a Bluetooth access point, or the like. The nodes (e.g., node H 220H) in close proximity to the AP 230 can receive transmissions from other nodes utilizing the ad hoc air interface and relay these transmissions to infrastructure equipment via uplink communication signal utilizing, for example, a cellular, Bluetooth or WLAN air interface. Similarly, nodes (e.g., node H 220H) in close proximity to the AP 230 can receive downlink communications over the cellular, Bluetooth or WLAN air interface and transmit uplink communications to another node via the ad hoc air interface.

Although not shown in FIG. 2, it will also be appreciated by those of ordinary skill in the art that the nodes 220A-220O, can also communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

Each node 220A-220O can advertise its presence to other nodes by periodically broadcasting an advertisement message. In turn, each node can identify its neighbor nodes, and maintain a neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 2, node D 220D has six neighbor nodes—node B 220B, node C 220C, node E 220E, node G 220G, node H 220H, and node I 220I.

Figure 3:
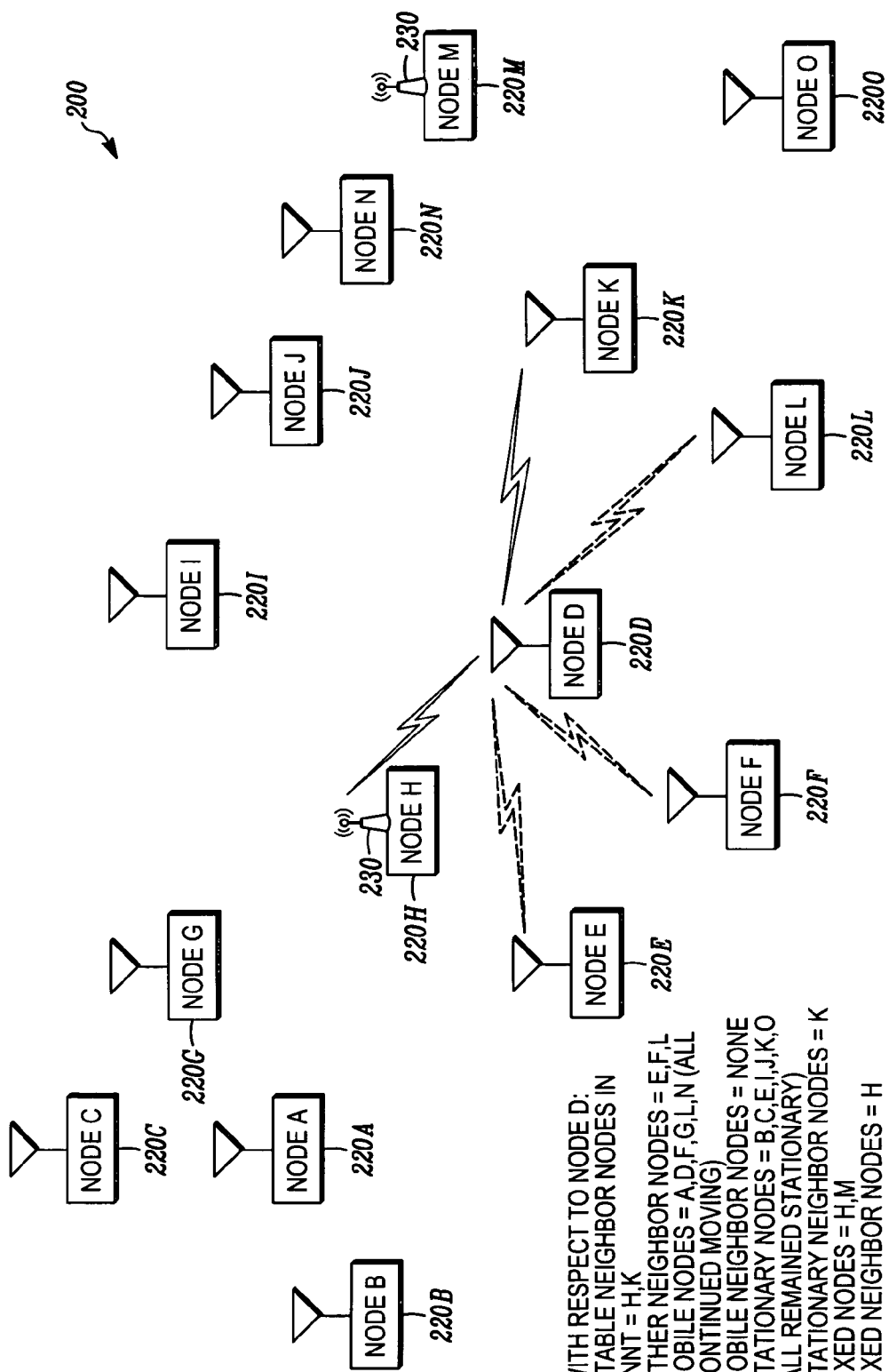
FIG. 3 is a block diagram of an exemplary ad hoc communication network at a second time.
Figure 4:
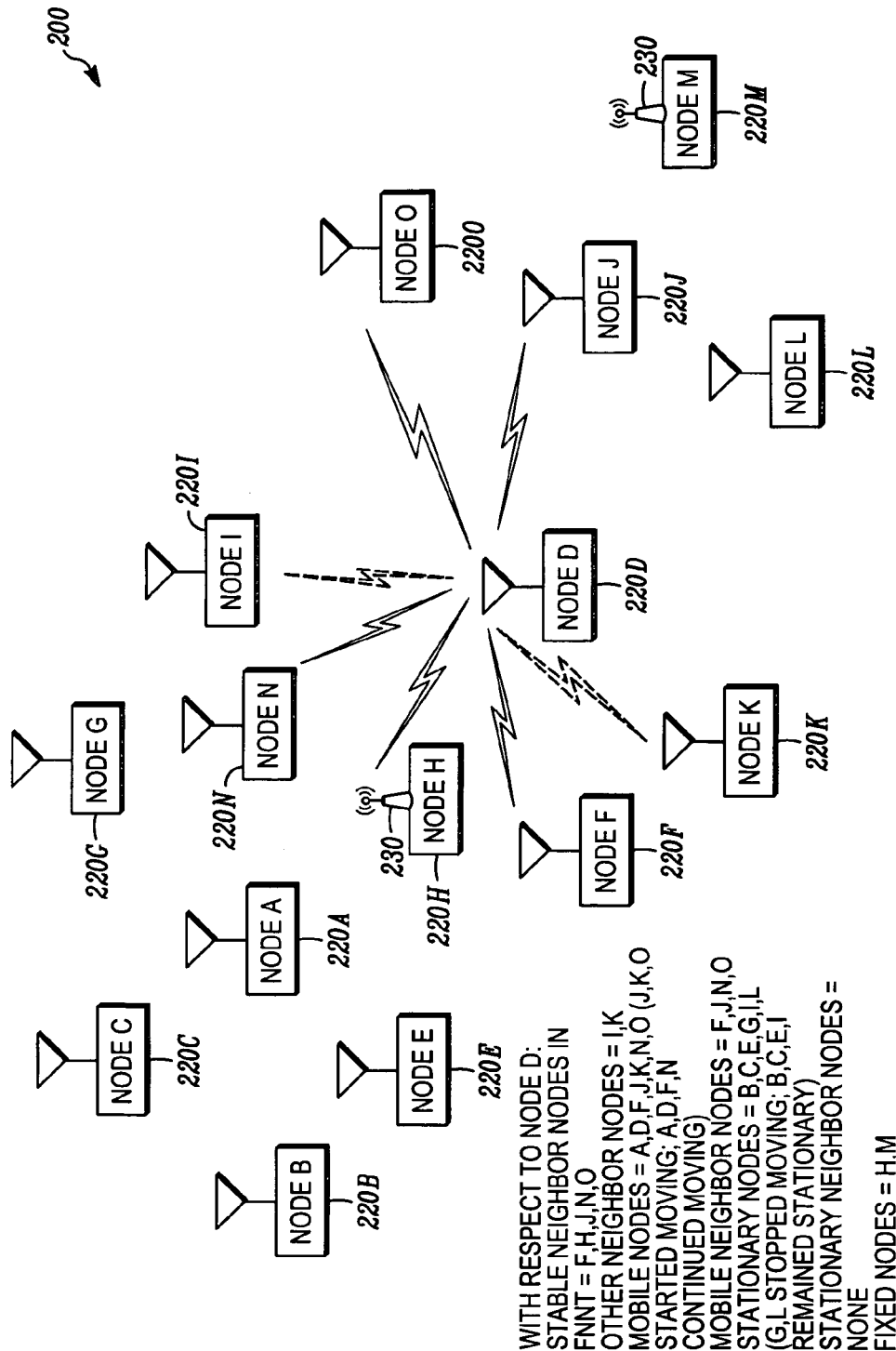
FIG. 4 is a block diagram of an exemplary ad hoc communication network at a third time.

As discussed above, the neighborhood topology of a particular node can change rapidly over time. In particular, the neighbor nodes within operable range of a particular node can change regularly, as many nodes are mobile and, therefore, can leave the operable range of the particular node. Other neighbor nodes are fixed or stationary and, therefore, do not leave the operable range. The "operable range" (i.e., within the neighborhood topology) of a particular node encompasses those fixed or mobile nodes in close enough proximity to the particular node, such than the signal strength between the nodes is sufficiently strong for coordinated actions between the nodes (e.g., data transmission actions) to occur. Moreover, it is possible that the particular node, itself, is mobile and encounters new neighborhood topologies, as it moves from one location to another, in the form of a partially- or entirely-new groups of neighboring fixed and mobile nodes. As a particular mobile node enters an area, for example, it will hear or encounter traffic from other nodes in the vicinity or neighborhood. Such an encounter will also provide the particular mobile node with signal strength information about the neighboring nodes that it is hearing from, which can include, for example, Received Signal Strength Indication (RSSI) and Bit Error Rate (BER). FIGS. 2-4 illustrate mobility of a particular node D 220D in a particular ad hoc network 200 and how neighbor node topologies change at different time instances.

In FIG. 2, nodes 220H, M are fixed nodes, while nodes 220A-G, I-L, N-O are all potentially mobile nodes. As noted above, FIG. 2 shows the ad hoc network 200 at a first time during which nodes 220 B, C, E, I, J, K, O are stationary, and nodes A, D, F, G, L, N are mobile (e.g., have moved or are currently moving).

FIG. 3 is a block diagram of an exemplary ad hoc communication network 200 at a second time. During the time period which elapses between the first time and the second time, nodes 220 A, D, F, G, L, N remain mobile nodes (e.g., are still currently moving), and nodes 220 B, C, E, I, J, K, O remain as stationary nodes (e.g., potentially mobile but not currently moving) and nodes 220 H, M remain as fixed nodes (e.g., immobile).

FIG. 4 is a block diagram of an exemplary ad hoc communication network 200 at a third time. During the time period which elapses between the second time and the third time, nodes 220 A, D, F, J, K, N, O were mobile nodes (e.g., have moved or are currently moving), while nodes 220 B, C, E, G, I, L were stationary nodes (e.g., potentially mobile but not currently moving) and nodes 220 H, M remain fixed (e.g., immobile). During this time period, nodes 220 K, O, J started moving, while nodes A, D, F, J, N continued moving, nodes 220 B, C, E, I remained stationary, and nodes 220 G, L have stopped moving.

Techniques will now be described for assessing whether particular nodes are mobile or stationary and to assess the speed with which mobile nodes move at particular points in time. Knowledge of these attributes is desirable because it enables the formation of assumptions about components of the network, which increases the efficiency of the network. For example, the location of an identified "fixed" node (via the methods discussed below) can be relied on by neighbor nodes without the neighbor nodes having to send beacon messages to the identified "fixed" node, which would otherwise result in a waste of network bandwidth. In other words, the network can make assumptions about the neighbor node, such as to the fact that if the node is not moving (or has not moved), then the other nodes in the network can assume that the node will still be there at a later time without having to send data to or from it. In this regard, the data exchange rates can be reduced.

Figure 5:
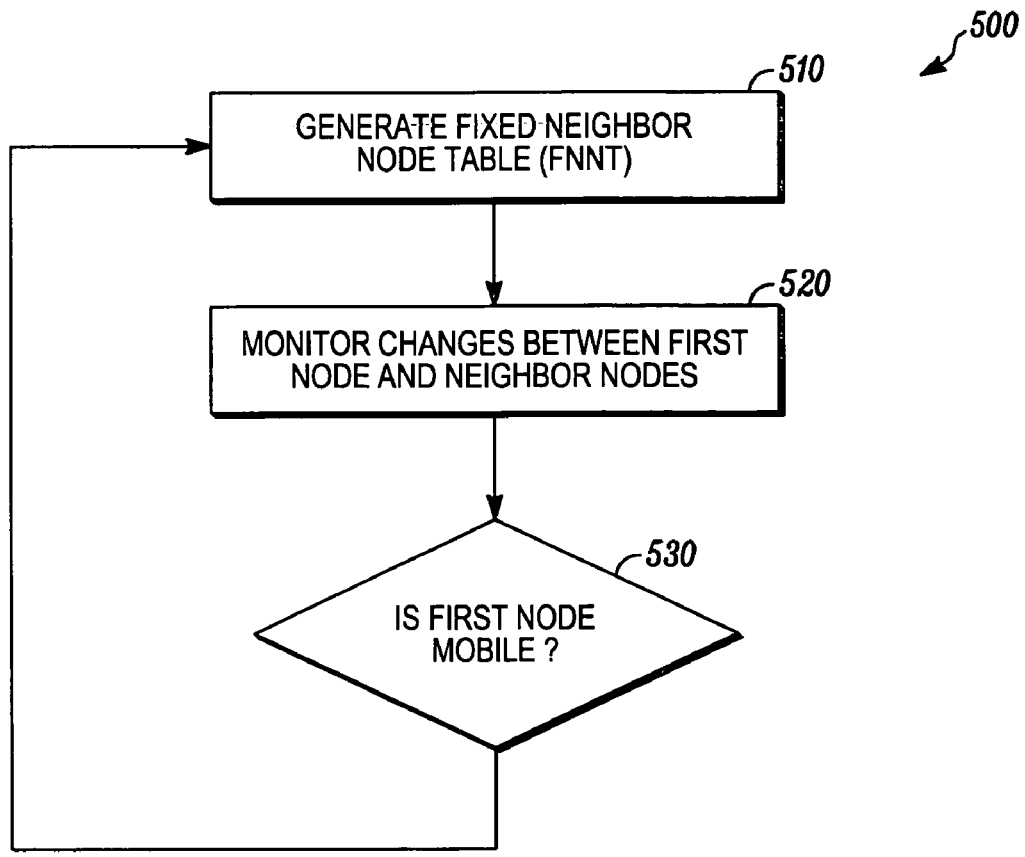
FIG. 5 is a flowchart showing an exemplary method for determining mobility of a first node in an ad hoc network in accordance with some embodiments of the invention.

FIG. 5 is a flowchart showing an exemplary method 500 for determining mobility of a first node in an ad hoc network in accordance with some embodiments of the invention. One possible implementation of the exemplary method 500 will be discussed with reference to FIGS. 2-4 in which the "first node" is presumed to be node D 220D for purposes of discussion. However, it will be appreciated that the methods in FIGS. 5-9 could be applied at all of the nodes in FIG. 2 and in other ad hoc network configurations having topologies which differ from that shown in FIGS. 2-4.

At step 510, the first node generates a fixed neighbor node table (FNNT) comprising neighbor nodes in the area or vicinity of the first node which are not mobile. A "mobile" node is a node that has "moved" or changed its position or a node that is currently "moving" or changing its position. The FNNT can be implemented as part of the first node's regular neighbor node table or as its own separate table. For example, the FNNT can be implemented by adding additional field to the normal neighbor node table maintained by nodes in a typical ad hoc network. Alternatively, the FNNT can be implemented as a separate table that is different than the neighbor table used for routing as it stores only the neighbors that show good signal strength even after a guard period (e.g., the neighbors with whom the signal quality is of oscillatory nature should not be included in this table.) In other words, the first node may sometimes receive from these nodes and will enter these nodes as neighbor nodes in its regular neighbor table. However, these nodes will not be included in the FNNT since it is likely that they will have low RSSI or will have oscillatory nature.

The FNNT is preferably maintained at the particular node for organizing information at the particular node pertaining to fixed neighbor nodes in an operable range of the particular node. The FNNT of the particular node can store information pertaining to fixed or stationary neighbor nodes around the particular node, as opposed to neighboring mobile nodes. In particular, if a newly-encountered neighboring node is determined to be a "fixed node," then it should be entered into the FNNT. Information pertaining to mobile nodes around the particular node is not stored since it is not helpful in assessing the degree of mobility of the particular node. By quantifying fixed neighbor nodes any sensed mobility can be accurately attributed to the particular node. The FNNT only needs to store information pertaining to fixed neighbor nodes that show good signal strength after a "guard period," i.e., those neighboring nodes transmitting a strong or sufficiently strong signal to the particular node for a sufficiently prolonged period of time. Neighbor nodes that do not have a consistently strong or durable signal strength (e.g., those nodes which have a signal quality of an oscillatory nature) are preferably excluded from the FNNT. Fixed neighbor nodes having signal strengths that vary significantly over short periods of time (e.g., because of interference or because the neighboring node is situated on the edge of the coverage area of the fixed neighbor node) can be excluded from the FNNT.

At the first time in FIG. 2, node 220D has six stable neighbor nodes, nodes 220B, C, E, G, H, I, and three other neighbor nodes 220 A, F, J which node. 220D also occasionally receives signals from. Nodes 220 A, B, C, E, F, G, H, I, J will have their addresses stored in the regular neighbor table of node 220D which is used for routing. However, node 220D will only include nodes 220B, C, E, G, H, I in its FNNT since node 220D only stores the neighbor nodes 220B, C, E, G, H, I that show good signal strength even after a guard period (e.g., the neighbors with whom the signal quality is of oscillatory nature should not be included in this table.) In other words, node 220D may sometimes receive from nodes 220 A, F, J and will enter these nodes in its regular neighbor table as neighbor nodes. However, nodes 220 A, F, J will not be included in the FNNT since nodes 220 A, F, J have low RSSI or an oscillatory nature.

In FIG. 3, node 220D has two neighbor nodes 220H, K, and also receives signals from three other nodes 220 E, F, L which are multiple hops away from node 220D. By comparing FIG. 2 to FIG. 3, it can be seen that nodes 220H, M are fixed and nodes 220B, C, E, I, K, J, O are stationary. Node 220H is a fixed neighbor node, and node 220K is a stationary neighbor node. As used herein, "fixed neighbor nodes" include nodes that are physically fixed and nodes that are presently stationary but potentially mobile. Thus, in this example, the "fixed neighbor nodes" are nodes 220 K, H.

At the third time in FIG. 4, node 220D has five stable neighbor nodes, nodes 220 F, H, J, N, O, and also occasionally receives signals from other neighbor nodes 220 I, K. Nodes 220 F, H, I, J, K, N, O will have their addresses stored in the regular neighbor table of node 220D which is used for routing. However, node 220D will only include nodes 220 F, H, J, N, O in its FNNT since node 220D only stores the neighbor nodes 220 F, H, J, N, O that show good signal strength even after a guard period (e.g., the neighbors with whom the signal quality is of oscillatory nature should not be included in this table.) In other words, node 220D may sometimes receive from nodes 220 I, K and will enter these nodes in its regular neighbor table as neighbor nodes. However, nodes 220 I, K will not be included in the FNNT since nodes 220 I, K have low RSSI or an oscillatory nature.

Nodes 220 A, D, F, J, K, N, O are mobile nodes, and node H is a fixed neighbor node. By comparing FIG. 3 to FIG. 4, it can be seen that nodes 220H, M are fixed and nodes 220 B, C, E, G, I, L are stationary. Nodes F, J, N, O are mobile neighbor nodes, node 220 H is a fixed neighbor node, and there are no stationary neighbor nodes.

At step 520, the first node monitors changes between the first node and the second nodes. In one implementation, the first node tracks the history about the neighbors that it can hear RF traffic from in its current location, and the changes in that neighborhood over time can be used to detect if that node has moved, or is continuously moving. For example, in the time period between FIG. 2 (first time) and FIG. 3 (second time), node 220D was mobile, nodes 220 B, C, E, I, J, K, O were stationary, and nodes 220 A, F, G were also mobile (e.g., moved or are currently moving). The new neighbor nodes of node 220D are fixed node 220H and stationary node 220K, while node 220D also received signals from stationary nodes 220E and mobile nodes 220 F, L. From this information, node 220D can determine that during the time period between the first time (FIG. 2) and the second time (FIG. 3), the previous neighbor list, which included nodes 220 B, C, E, G, H, I, has now changed to new neighbor list which includes nodes 220 H, K.

Similarly, in the time period between FIG. 3 (second time) and FIG. 4 (third time), node 220D was mobile, nodes 220 B, C, E, G, I were stationary, and nodes 220 A, F, J, K, N, O were mobile (e.g., moved or are currently moving). The new neighbor nodes of node 220D are nodes F, J, N, O, while node 220D also receives signals from stationary node 220I and mobile node 220K. From this information, node 220D can determine that during the time period between the second time (FIG. 3) and the third time (FIG. 4), the previous neighbor list, which included nodes 220 H, K, has now changed to new neighbor list which includes nodes 220 F, H, J, N, O.

At step 530, the first node can determine if it is mobile based on the changes.

Figure 6:
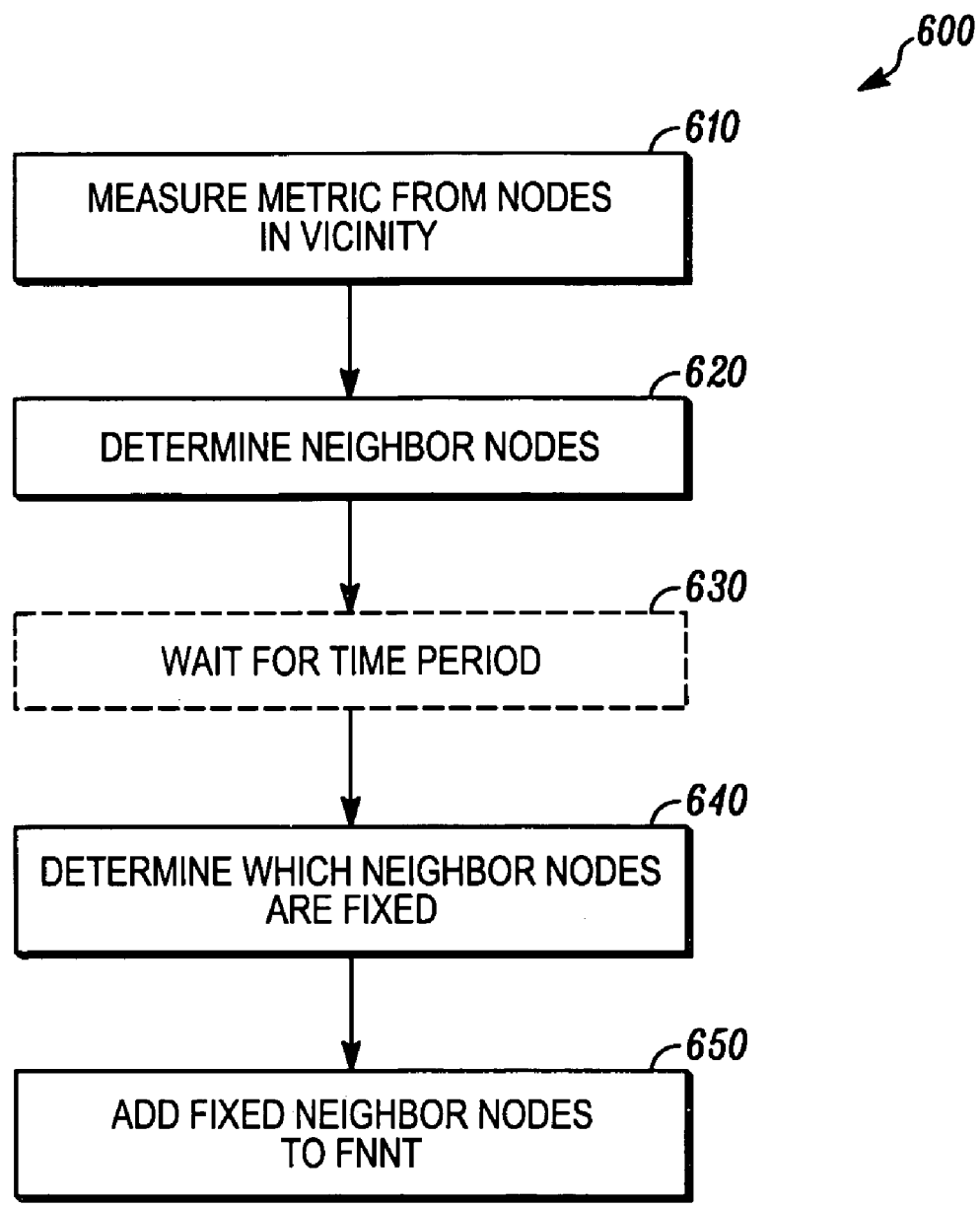
FIG. 6 is a flowchart showing an exemplary method for generating a fixed neighbor node table (FNNT) in accordance with some embodiments of the invention.

FIG. 6 is a flowchart showing an exemplary method 600 for generating a FNNT in accordance with some embodiments of the invention. As a mobile node enters an area, it will begin to hear traffic from the other nodes in this area. Hearing this traffic can provide the mobile node with signal strength information about the nodes that it is hearing from. This can include, but is not limited to, a received signal strength indicator (RSSI), post detection signal quality (PDSQ), a power measurement, a bit error rate (BER), a frame error rate (FER), a block error rate (BER), received signal power (RX Power), or other indicia of channel quality, etc. If the node being heard is a fixed node, then it should be entered in the FNNT (which also stores other information about neighbors).

At step 610, the first node measures a metric of information received from other nodes in the area or vicinity of the first node. For example, in FIG. 2 node 220D can measure RSSI from nodes 220 A-C, E-J, whereas in FIG. 3, node 220D can measure RSSI from nodes 220 E, F, H, K, L, and in FIG. 4 node 220D can measure RSSI from nodes 220 F, H-K, N, O.

At step 620, the first node uses the metric to determine its true neighbor nodes. In wireless networks, because of complex nature of RF waves, a first node can receive a message from a node which is actually far away and may not necessarily be a neighbor node (e.g., the first node may not receive any message from it again). These other nodes should not be used to determine mobility as it can give wrong results. Neighbor nodes whose signal strengths is varying constantly (this can happen if the subscriber is on the edge of the coverage area of the fixed node or due to interference) are not included in the FNNT. This is done by keeping the history of neighbors for some time. As such, only those nodes whose RSSI is greater than some threshold should be deemed stable "neighbor nodes," and will be included in the FNNT. The threshold can be chosen, for example, such that only the nodes which are in 300 meter range are designated as neighbor nodes. In FIG. 2, node 220D can determine that nodes 220 B, C, E, G, H, I are its stable neighbor nodes, and that other neighbor nodes 220 A, F, J are not stable. Similarly, in FIG. 3, node 220D can determine that nodes 220 H, K are its stable neighbor nodes, and that nodes 220 E, F, L are not stable. In FIG. 4, node 220D can determine that nodes 220 F, H, J, N, O are its stable neighbor nodes, and that neighbor nodes 220 I, K are not stable neighbors.

After waiting for an optional guard period at step 630, at step 640, the first node can determine whether the neighbor nodes are fixed. There are a number of techniques by which the first node can determine whether its neighbor nodes are fixed or mobile. For example, each of the neighbor nodes can periodically send a message to the first node indicating whether the particular neighbor node is mobile. Alternatively, each of the neighbor nodes can periodically send a message to the first node indicating its type (e.g., Intelligent Access Point (IAP) or Wireless Router (WR)). The first node can then infer whether such types of nodes are mobile or not. Alternatively, each of the neighbor nodes can have a single bit (or flag) in all the messages it sends indicating whether it is fixed or mobile.

At step 650, the first node designates the ones of the neighbor nodes determined to be fixed as "second" or "fixed neighbor" nodes, and includes the second nodes in the fixed neighbor node table (FNNT). For example, in FIG. 2, node 220D can designate neighbor node 220H as being a fixed neighbor node, nodes 220 B, C, E, I, J, K, O as stationary neighbor nodes and add neighbor node 220 B-E, I-K and O to the FNNT. In FIG. 3, node 220D can designate neighbor node 220H as being a fixed neighbor node, designate node 220K as a stationary neighbor node, and add neighbor nodes 220 H, K to the FNNT. Thus, during the time period between the first time (FIG. 2) and the second time (FIG. 3), the number of fixed neighbor nodes has increased by six. In FIG. 4, node 220D can designate neighbor node 220H as being a fixed neighbor node and maintain it the FNNT. Thus, during the time period between the second time (FIG. 2) and the third time (FIG. 3), the number of fixed neighbor nodes has decreased by 1 (from two to one).

Several techniques can be used to monitor changes between the first node and the second nodes (step 520). Some of these techniques will now be described with reference to FIGS. 7-9.

In one embodiment, the particular nodes can monitor and record the "entry time" for each fixed neighbor node into the FNNT, and the "exit time" for each fixed neighbor node out of the FNNT. The "entry time", in this regard, is the time point at which the particular node encounters its first message (e.g. RTS, CTS, Data, or Hello messages) of sufficient signal quality from a fixed neighbor node. The "exit time", on the other hand, is the time point at which the signal quality of messages arriving at the particular node from a fixed neighbor node drops below a threshold signal quality. The "threshold signal quality", in this regard, can be defined based on desired network performance and characteristics.

The particular node can also monitor and record the number of fixed neighbor nodes with which it loses contact in a time period. In this regard, the particular nodes preferably have the ability to monitor, quantify and record the average contact period between the particular node and the fixed neighbor nodes. The "contact period" between a particular node and a fixed neighbor node, in this regard, is the difference between the "entry time" and the "exit time", which signifies the time in which the nodes were in contact. The "average contact period" for all fixed neighbor nodes in the FNNT is informative both as to the degree of mobility of a particular node and as to the velocity that the particular node is moving, if mobile. In this regard, if the average contact period is below a threshold number, the particular node can be designated as a "mobile" node. If the average contact period is above the threshold number, then the particular node can be designated as a "stationary node." Moreover, in many cases, the average of "contact times" for fixed neighbor nodes can be proportional to the velocity of the particular node.

Figure 7:
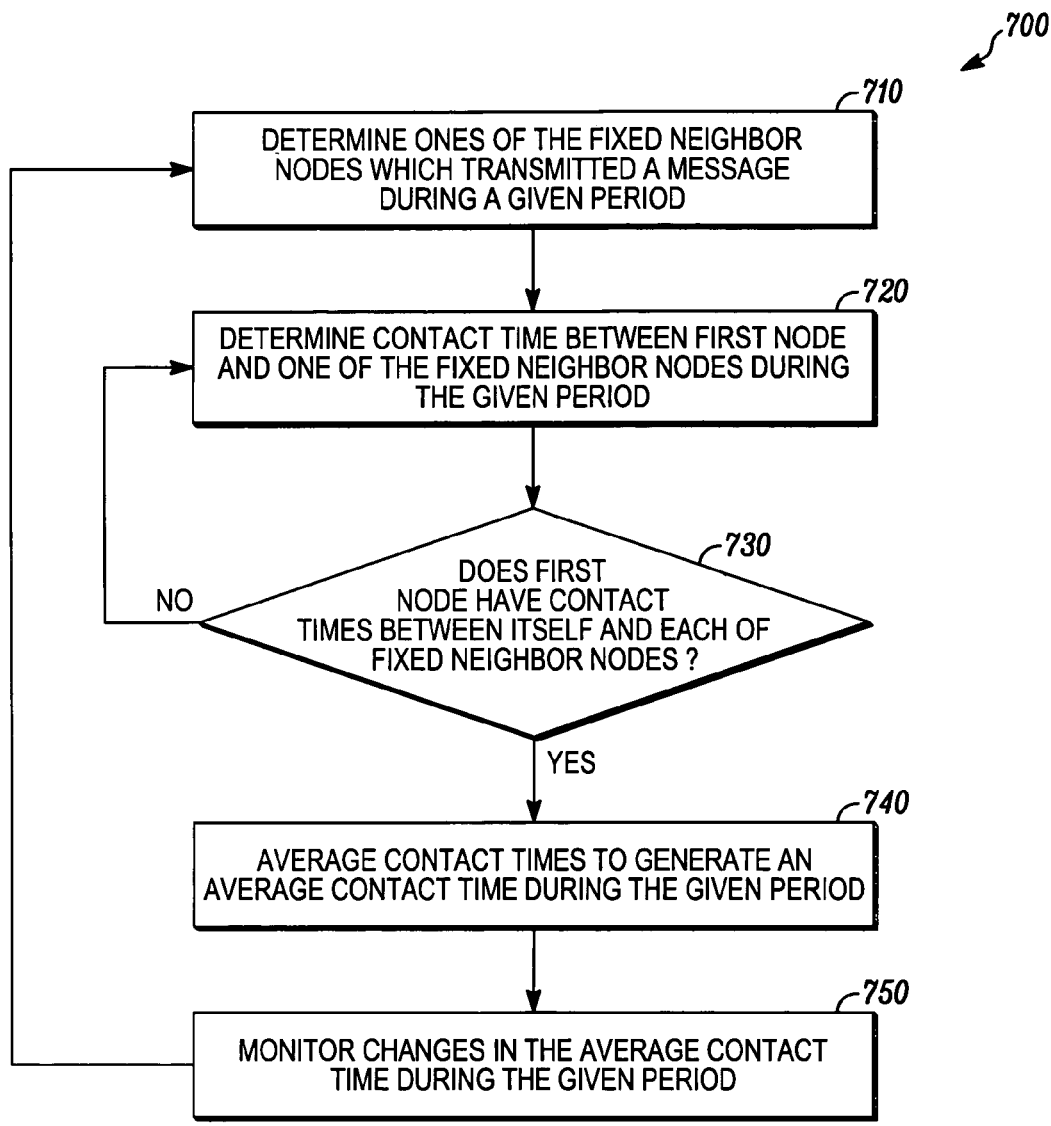
FIG. 7 is a flowchart showing an exemplary method for monitoring changes between the first node and the second nodes in an ad hoc network in accordance with some embodiments of the invention.

FIG. 7 is a flowchart showing another exemplary method 700 for monitoring changes between the first node and the second nodes in an ad hoc network in accordance with some embodiments of the invention.

At step 710, the first node can determine whether or not it has received periodically transmitted messages from each of the second nodes. This process repeats for each of the second nodes. The periodically transmitted messages let the first node 220D know that it still has an active communication link to certain ones of the second nodes (and vice-versa). The periodically transmitted messages can be, for example, route advertisement messages, hello messages, RTS messages, CTS messages, data messages, etc. with sufficient signal quality from the second node. For example, in the example shown in FIG. 2, the first node 220D can determine whether or not it has received periodically transmitted messages from each of the neighbor nodes 220 B, C, E, G, H, I. In the example shown in FIG. 3, the first node 220D can determine whether or not it has received periodically transmitted messages from each of the neighbor nodes 220 H, K and in the example shown in FIG. 4, the first node 220D can determine whether or not it has received periodically transmitted messages from each of the neighbor nodes 220 F, H, J, N, O.

At step 720, the first node can determine a contact time between itself and one of the second nodes by determining a time period during which messages are being received at the first node from each of the second nodes. This process repeats for each of the second nodes. For example, during the first observation period (e.g., between the first time (FIG. 2) and the second time (FIG. 3)), the contact time between node 220D and node 220K starts being recorded and the contact time between node 220D and nodes 220 B, C, E, G, I stops recording, and the contact time between node 220D and node 220H continues to accumulate. During the second observation period (e.g., between the second time (FIG. 3) and the third time (FIG. 4)), the contact time between node 220D and nodes 220 F, J, N, O starts being recorded, the contact time between node 220D and node 220 K stops recording, and the contact time between node 220D and node 220H continues to accumulate.

At step 730, the first node can determine if the first node has determined a contact time between itself and each of the second nodes. If the first node has not determined a contact time between itself and each of the second nodes, then the process loops back to step 720 where the first node can determine a contact time between itself and another one of the second nodes. If the first node has determined a contact time between itself and each of the second nodes, then the process proceeds to step 740, where the first node can average the contact times. For example, during the first observation period (e.g., between the first time (FIG. 2) and the second time (FIG. 3)), the contact times between node 220D and nodes 220 B,C,E,G, I can be averaged. During the second observation period (e.g., between the second time (FIG. 3) and the third time (FIG. 4)), the contact times between node 220D and node 220 K can be averaged.

At step 750, the first node can monitor changes in an average contact time between the first node and the second nodes to determine whether the first node is stationary or mobile.

Figure 8:
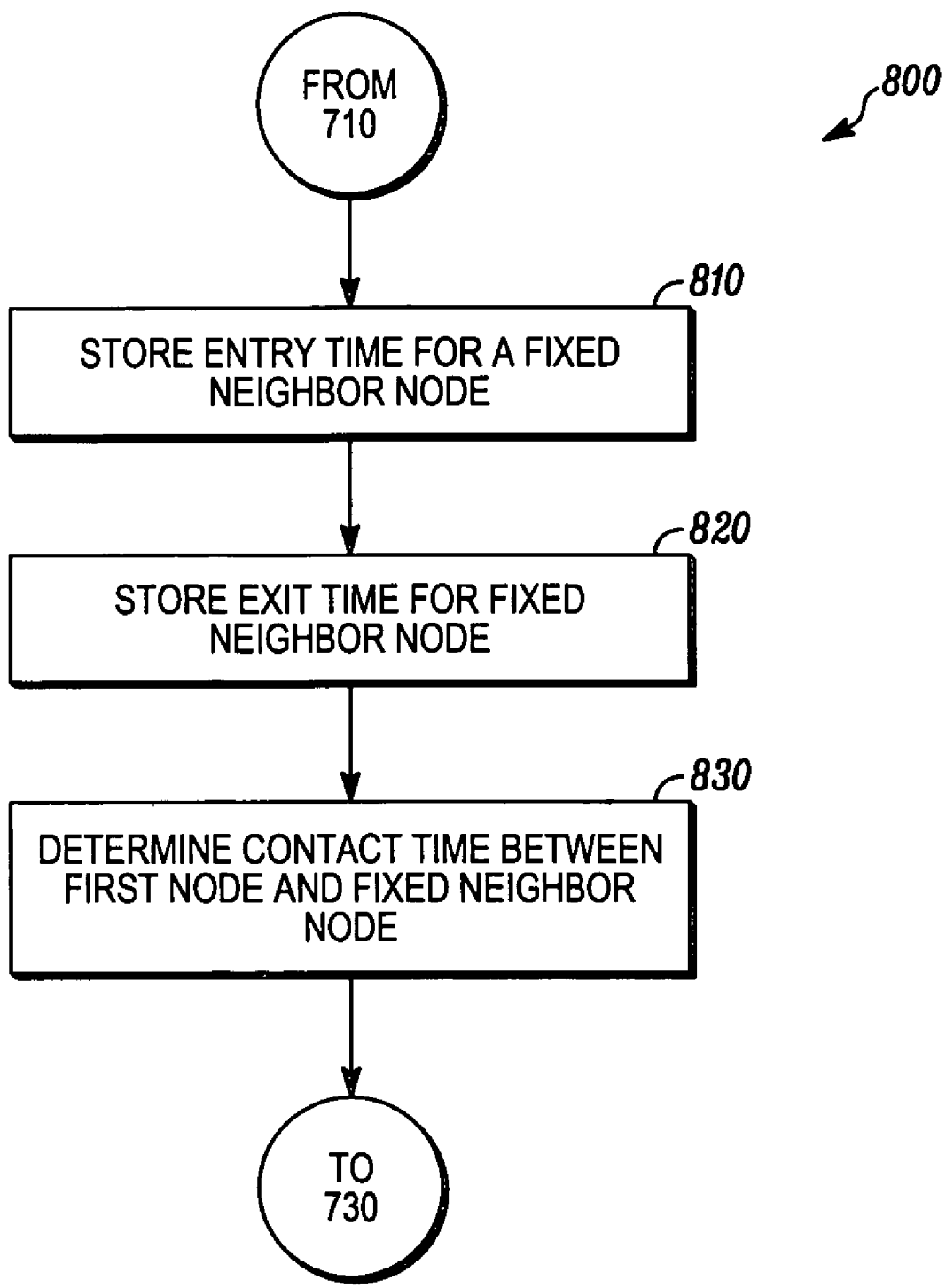
FIG. 8 is a flowchart showing an exemplary method for determining a contact time between a first node and one of the second nodes in accordance with some embodiments of the invention.

FIG. 8 is a flowchart showing an exemplary method 800 for determining a contact time between a first node and one of the second nodes in accordance with some embodiments of the invention.

At step 810, the first node can maintain an entry time for a particular one of the second nodes. The entry time associated with each of the second nodes comprises a first time when the first node first begins receiving a message having signal quality above a threshold from that second node. The periodically transmitted messages can be, for example, route advertisement messages, hello messages, RTS messages, CTS messages, data messages, etc. with sufficient signal quality from the second node.

At step 820, the first node can maintain an exit time for the particular one of the second nodes. The exit time associated with the particular one of the second nodes comprises a second time when the first node stops receiving messages, having signal quality above the threshold, from the particular one of the second nodes.

At step 830, the first node can determine a contact time associated with the particular one of the second nodes (when the first node stops receiving messages having signal quality above a threshold the particular one of the second nodes). The contact time comprises the difference between the exit time and the entry time, and represents the amount of time the first node was in contact with particular one of the second nodes.

Figure 9:
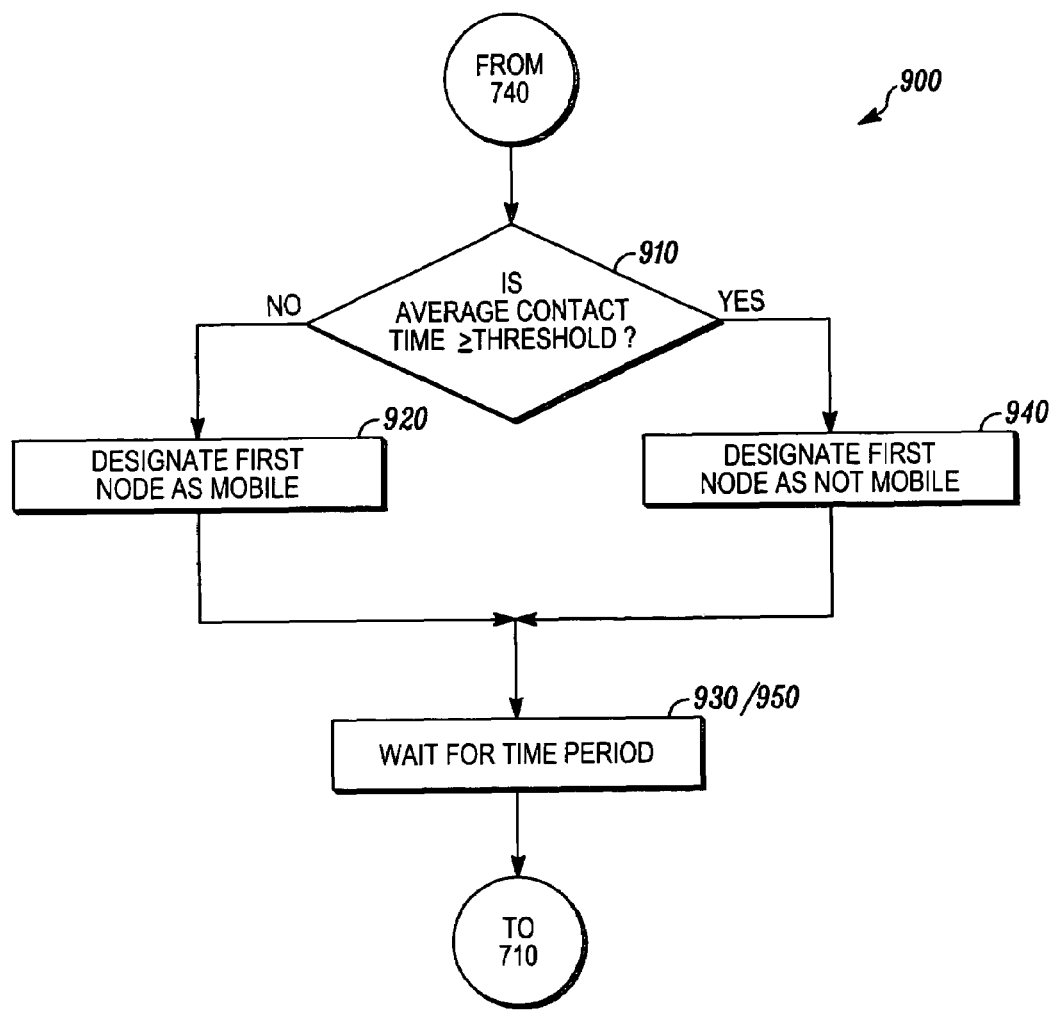
FIG. 9 is a flowchart showing an exemplary method for monitor changes in an average contact time between the first node and the second nodes in accordance with some embodiments of the invention.

FIG. 9 is a flowchart showing an exemplary method 900 for monitor changes in an average contact time between the first node and the second nodes in accordance with some embodiments of the invention.

At step 910, the first node can determine if the average contact time is greater than or equal to a threshold. This threshold is implementation specific (e.g., dependent upon the particular network configuration) and can be determined by measurements of the particular network. If the average contact time is less than the threshold, then at step 920, the first node determines that it is in a mobile state. After it has been determined that the first node is in the mobile state, the first node must wait a period of time at step 930 before changing its status to a stationary state, for example, if the first node later determines that the first node is in a stationary state (e.g., if the first number is greater than or equal to the threshold value).

By contrast, if it is determined at step 910 that the average contact time is greater than or equal to the threshold (determined by measurements), then at step 940 the first node can determine that the first node is in a fixed or stationary state. As above, after it has been determined that the first node is in the fixed or stationary state at step 940, then at step 950 the first node must wait a period of time before changing its status to a mobile state should the first node later determine that the first node is in a mobile state (e.g., if the average contact time is greater than or equal to the threshold value).

Accordingly, as can be appreciated from the above, the embodiments of the present invention provide an effective and efficient system and method for detecting node mobility in a communication network, taking into account changes in network topology and other factors affecting the network.

Given a mobile node in an ad-hoc network with nodes that are known as fixed (never relocating), the data about those fixed nodes can be monitored in an effort to determine if the mobile node is in a mobile or fixed state at any moment in time. One goal of this determination is to allow the network and the mobile nodes behave differently in each state. In a stationary state, the network can make assumptions about that node, such as the fact that if it is not moving, or has not moved, the other nodes in the network may assume that it will still be there at a later time without sending data to or from it wasting precious network bandwidth. At a minimum, the data exchange rate with the node may be reduced. Therefore, the routing algorithms that determine how the rest of the network reaches any given node consumes much less overhead. In the mobile state, nodes are rapidly changing topology such that the network must quickly react to learn which nodes in the network can be used to reach that mobile node. Therefore the distribution of routing data must occur more frequently to keep up with this change. The benefits are not limited to routing data exchange, but may include other services that exchange periodic data with the mobile nodes. For example, a location determination algorithm will not have to run if a node is not mobile saving bandwidth, because it will always return the same location.

In the foregoing specification, specific embodiments of the present invention have been described. However, one of ordinary skill in the art appreciates that various modifications and changes can be made without departing from the scope of the present invention as set forth in the claims below. For example, these concepts can also be applied to multicast groups as well, where a subset of the nodes in the ad hoc network belongs to a multicast group. In addition, service types may be used as a basis for establishing multicast groups.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for determining mobility of a first node in an area of an ad hoc network, comprising:
    generating a fixed neighbor node table comprising second nodes in the area which are not mobile;
    monitoring changes between the first node and the second nodes; and
    determining if the first node is mobile based on the changes,
    wherein generating a fixed neighbor node table comprising the second nodes in the area which are not mobile, comprises:
    measuring a metric of information received from other nodes in the area;
    using the metric to determine neighbor nodes;
    determining whether the neighbor nodes are fixed; and
    designating the ones of the neighbor nodes determined to be fixed as second nodes and including the second nodes in the fixed neighbor node table.

2. A method for determining mobility of a first node in an area of an ad hoc network, comprising:
    generating a fixed neighbor node table comprising second nodes in the area which are not mobile;
    monitoring changes between the first node and the second nodes; and
    determining if the first node is mobile based on the changes,
    wherein monitoring changes between the first node and the second nodes, comprises:
    periodically transmitting a message from each of the second nodes;

determining contact times between the first node and each of the second nodes by determining if the messages are being received at the first node from the second nodes;

averaging the contact times to determine an average contact time; and monitoring changes in the average contact time between the first node and the second nodes.

3. A method according to claim 2, wherein determining contact times between the first node and each of the second nodes, comprises:

maintaining an entry time for each of the second nodes, wherein the entry time associated with each of the second nodes comprises a first time when the first node first receives a message having signal quality above a threshold from that second node;

maintaining an exit time for at least some of the second nodes, wherein the exit time associated with those second nodes comprises a second time when the first node stops receiving messages, having signal quality above the threshold, from those second nodes; and determining a contact time associated with the at least some of the second nodes, the contact time comprising the difference between the exit time and the entry time.

4. A method according to claim 3, wherein the contact time represents the amount of time the first node was in contact with each of the second nodes that the first node stops receiving messages from having signal quality above the threshold, and wherein the average contact time indicates movement of the first node.

5. A method according to claim 3, wherein determining if the first node is mobile based on the changes, comprises:

determining that the first node is in a mobile state if the average contact time is less than a threshold.

6. A method according to claim 5, after it has been determined that the first node is in the mobile state, further comprising:

determining that the first node is in a stationary state if the first number is less than the threshold value, wherein the first node must wait a period of time before changing its status to a stationary state.

7. A method according to claim 3, wherein determining if the first node is mobile based on the changes, comprises:

determining that the first node is in a stationary state if the average contact time is greater than or equal to a threshold.

8. A method according to claim 7, after it has been determined that the first node is in the stationary state, fUrther comprising:

determining that the first node is in a mobile state if the first number is greater than or equal to the threshold value, wherein the first node must wait a period of time before changing its status to a mobile state.

9. A method for assessing the degree of mobility of a particular node in a mobile ad-hoc network, comprising:

monitoring and recording in a neighbor table of the particular node each fixed neighbor node in an operable range of the particular node;

monitoring and recording for each fixed neighbor node the entry time to and exit time from the operable range of the particular node; and quantifying the average contact period for the fixed neighbor nodes, wherein an average contact period greater than a threshold duration indicates a lack of mobility of the particular node.

10. A first node configured to determine whether it is mobile in an ad hoc network, comprising:

a processor configured to generate a fixed neighbor node table comprising second nodes which are not mobile, monitor changes in contact times between the first node and the second nodes, and determine if the first node is mobile based on the changes in the contact times between the first node and the second nodes, wherein the processor is configured to measure a metric of information received from other nodes in an area of the first node, use the metric to determine neighbor nodes, determine whether the neighbor nodes are fixed, designate the ones of the neighbor nodes determined to be fixed as second nodes, and include the second nodes in the fixed neighbor node table.

11. A first node configured to determine whether it is mobile in an ad hoc network, comprising:

a processor configured to generate a fixed neighbor node table comprising second nodes which are not mobile, monitor changes in contact times between the first node and the second nodes, and determine if the first node is mobile based on the changes in the contact times between the first node and the second nodes; and a receiver configured to periodically receive a message from each of the second nodes, and wherein the processor is further configured to determine contact times between the first node and each of the second nodes by determining if the messages are being received at the first node from the second nodes, average the contact times to determine an average contact time, and monitor changes in the average contact time between the first node and the second nodes.

12. A first node according to claim 11, further comprising:

a memory configured to store an entry time for each of the second nodes and to store an exit time for at least some of the second nodes, wherein the entry time associated with each of the second nodes comprises a first time when the first node first receives a message having signal quality above a threshold from that second node, and wherein the exit time associated with those second nodes comprises a second time when the first node stops receiving messages, having signal quality above the threshold, from those second nodes, and wherein the processor is configured to determine a contact time associated with the at least some of the second nodes, the contact time comprising the difference between the exit time and the entry time.

13. A first node according to claim 12, wherein the contact time represents the amount of time the first node was in contact with each of the second nodes that the first node stops receiving messages from having signal quality above the threshold, and wherein the average contact time indicates movement of the first node.

14. A first node according to claim 12, wherein the processor is configured to determine that the first node is in a mobile state if the average contact time is less than a threshold.

15. A first node according to claim 14, wherein the processor is configured to wait a period of time after the processor determines that the first node is in the mobile state before changing its mobility status to a stationary state.

16. A first node according to claim 12, wherein the processor is configured to determine that the first node is in a stationary state if the average contact time is greater than or equal to a threshold.

17. A first node according to claim 16, wherein the processor is configured to wait a period of time after the processor determines that the first node is in the stationary state before changing its mobility status to a mobile state.

18. A first node configured to assess its mobility status in an ad hoc network, the first node comprising:
- a processor configured to determine which nodes in an operable range of the first node are fixed neighbor nodes, an entry time for each fixed neighbor node, and an exit time for each fixed neighbor node;
- a memory configured to store the fixed neighbor nodes in a fixed neighbor node table, the entry time for each fixed neighbor node, and the exit time for each fixed neighbor node, wherein the processor is configured to determine a contact period between the first node and each of the fixed neighbor nodes, and to determine an average of the contact periods, wherein the processor determines that the first node is stationary if the average is greater than or equal to a threshold duration.

* * * * *